E. Allen,
Making Cartridge Cases.
Nº 27,094.  Patented Feb. 14. 1860.

Witnesses;
Geo. W. Fairfield
Jas. G. Arnold

Inventor;
Ethan Allen

UNITED STATES PATENT OFFICE.

ETHAN ALLEN, OF WORCESTER, MASSACHUSETTS.

IMPROVEMENT IN MACHINES FOR MAKING PERCUSSION-CARTRIDGE CASES.

Specification forming part of Letters Patent No. 27,094, dated February 14, 1860.

*To all whom it may concern:*

Be it known that I, ETHAN ALLEN, of the city and county of Worcester, State of Massachusetts, have invented certain new and useful Improvements in Machinery for Making Loaded Caps or Cap-Cartridges; and I hereby declare the following to be a full, clear, and exact description of the construction and operation of the same, reference being had to the accompanying drawings, in which—

Figure 1:
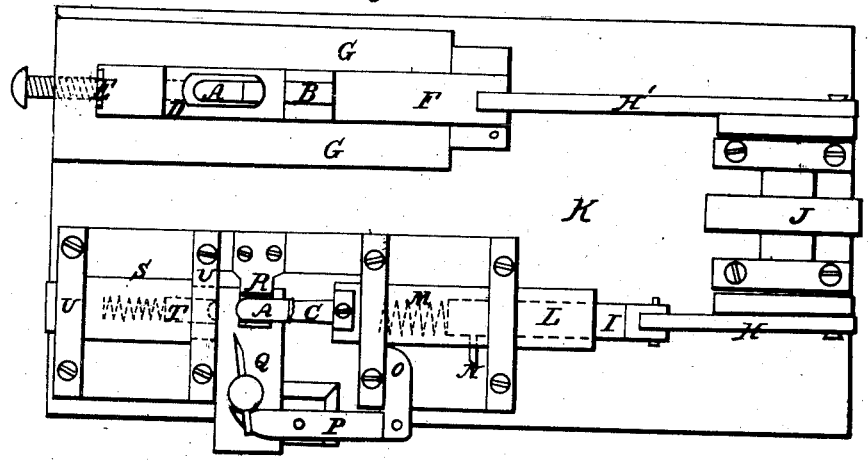
Figure 2:
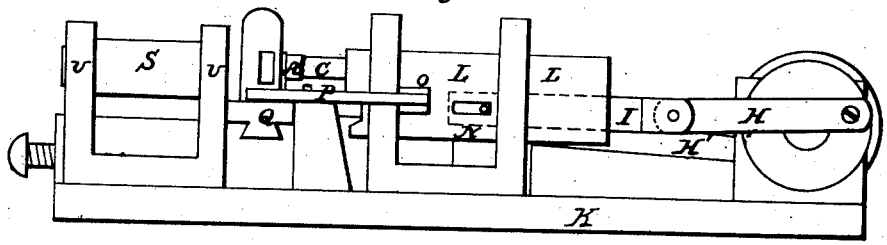
Figure 2:

Figure 1 is a top view or plan, and Fig. 2 a side view, the same letters indicating the same parts in both.

My improvements relate to the construction or formation of the case of the cap-cartridge in the form shown at Z, or nearly so; and it consists in an arrangement or mechanism to trim the open end, to make them all alike true and also in striking up or forming the swelled end to form the recess for the priming, as shown at Z, from that of Y at one stroke, in distinction from spinning them, as has heretofore been done.

The construction of my improvements as shown in the drawings is as follows:

J is the driving-pulley to receive motion, and its shaft is provided with cranks or eccentrics at each end, to which the rods H and H' connect, the shaft turning in suitable bearings in the frame or base K.

L is a slide carrying a mandrel C at its end, so arranged as to turn freely in L, and fits the tube of the case A, L receiving its motion from the slide I, placed in it, with a spring M at its inner end and pin N at one side, and so arranged that after moving L a certain distance L may be stopped and the slide I, compressing the spring M, continue its motion the remainder of the length of crank on J.

S is a hollow mandrel, receiving motion and giving it to an internal chuck T, backed up by a spring, its center being on a line with the center of mandrel C.

Q is a slide placed at right angles, or nearly so, to L, and carries a tool for cutting off the end of the case, similar to ordinary turning-lathes, having a spring or weight to press the tool back from the work, the lever P being so hung and provided with the arm O that when the slide I is moved clear forward its pin N presses against the sloping or cam surface of O, pressing it back, and by the other end of P moving the tool up to its work.

V V are bearings or boxes for the mandrel S.

R is a guard to facilitate placing the rough case on the mandrel C and removing the trained one.

F is a slide receiving motion by H' and moving in the ways G G, carrying the mandrel B, which passes through the movable die D, which has a spring to keep or move it back toward F, and an enlargement in its center to facilitate placing the case A' to be taken by B. The end of D next to E has a hole fitting on the outside of the case A.

E is a die with an adjusting-screw.

Y is a case as it comes from the press, and Z shows the same as being trimmed and set, or, in other words, going through the following operation, to wit: Motion being given to mandrel S and pulley J, the case A is placed so as to be taken by C and carried into S, pressing back the chuck T, which by its pressure gives a rotary motion to both A and C, and when the case is far enough the slide L stops and I, continuing, moves up the tool in Q by P through N against O, and the point of the tool cuts or trims the case A the exact length, and then the slide I, moving back, the tool and slide Q return to place, leaving the case to follow the slide L or mandrel C out of S, when it is placed in D or A', to be taken on B and carried forward until its end projects (sufficiently to form its rim) out of D, when F, meeting D, carries it with A in that position up against E, which fastens the end and forms the hollow rim, as shown in section at Z, Fig. 2, and the motion of J continuing, the parts all return to their respective places, ready for another, which during the same time has been prepared, as before described, the finished case dropping between the dies D and E, or, if sticking in D, is punched out by the first motion of the next one and falls out of its way.

Having thus fully described my invention, what I claim therein as new, and desire to secure by Letters Patent, is—

1. The trimming mechanism composed of the sliding loose mandrel C, the revolving chuck-mandrel S, and automatic tool, when constructed and operating substantially as described.

2. Striking or forming the hollow rim at one stroke or operation, as above set forth and described.

ETHAN ALLEN.

Witnesses:
 GEO. W. FAIRFIELD,
 JAS. G. ARNOLD.